US008882389B2

(12) United States Patent  (10) Patent No.: US 8,882,389 B2
Bastesen et al.  (45) Date of Patent: Nov. 11, 2014

(54) PIPELINE TERMINATION SKID

(71) Applicant: Vetco Gray Scandinavia AS, Stavanger (NO)

(72) Inventors: Rolf Sigvald Bastesen, Vinterbro (NO); Steinar Thorsen, Stavanger (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 14/055,152

(22) Filed: Oct. 16, 2013

(65) Prior Publication Data

US 2014/0105688 A1  Apr. 17, 2014

(30) Foreign Application Priority Data

Oct. 16, 2012  (EP) .................................... 12007171

(51) Int. Cl.
*F16L 1/26*  (2006.01)

(52) U.S. Cl.
CPC ...................................... *F16L 1/26* (2013.01)
USPC ....................................................... 405/169

(58) Field of Classification Search
USPC .......................................... 405/158, 169, 170
See application file for complete search history.

(56) References Cited

U.S. PATENT DOCUMENTS

| | | | | |
|---|---|---|---|---|
| 3,578,233 A | * | 5/1971 | Meister et al. .................. | 228/5.1 |
| 4,019,334 A | | 4/1977 | Sinclair et al. | |
| 4,028,903 A | * | 6/1977 | Dietrich ......................... | 405/170 |
| 4,218,158 A | * | 8/1980 | Tesson ........................... | 405/170 |
| 5,018,903 A | * | 5/1991 | O'Donnell et al. ............ | 405/170 |
| 6,142,708 A | | 11/2000 | Tarlton et al. | |
| 6,234,717 B1 | | 5/2001 | Corbetta | |
| 6,817,808 B1 | * | 11/2004 | Patinet .......................... | 405/170 |
| 6,997,645 B2 | * | 2/2006 | von Trepka et al. ........... | 405/170 |
| 7,503,727 B2 | | 3/2009 | Ingebretsen et al. | |
| 2003/0049076 A1 | * | 3/2003 | Bekkevold et al. ............ | 405/170 |
| 2007/0269270 A1 | * | 11/2007 | Bastesen et al. ............... | 405/170 |
| 2009/0297274 A1 | * | 12/2009 | Cafaro et al. .................. | 405/170 |

FOREIGN PATENT DOCUMENTS

| | | |
|---|---|---|
| AU | 2005261452 A1 | 1/2006 |
| GB | 1278112 A | 6/1972 |
| GB | 2429507 A | 2/2007 |
| NO | 321979 B1 | 7/2006 |
| RU | 2381405 C2 | 2/2010 |
| WO | 00/60262 A1 | 10/2000 |
| WO | 2006005994 A1 | 1/2006 |

OTHER PUBLICATIONS

Search Report issued to EP Application No. 12007171.7 dated Mar. 28, 2013.

* cited by examiner

*Primary Examiner* — Tara M. Pinnock
(74) *Attorney, Agent, or Firm* — GE Global Patent Operation (57) ABSTRACT

A pipeline termination skid to be mounted to a pipeline end section in order to support a pipeline hub of the pipeline end section during and after the connection of the pipeline hub to a corresponding spool piece hub. The termination skid comprises a base frame having a downwardly directed opening for a pipeline end section, and at least one holding unit provided with a downwardly directed seat having a downwardly directed entrance opening so as to allow the pipeline end section to be moved into contact with the seat by being lifted upwards through the entrance opening. The holding unit is provided with a locking device for securing the pipeline end section to the holding unit in a lifted position in contact with the seat of the holding unit.

20 Claims, 6 Drawing Sheets

PIPELINE TERMINATION SKID

BACKGROUND OF THE INVENTION

Embodiments of the present invention relate to a pipeline termination skid and a method for subsea connection of a pipeline termination skid to a pipeline end section provided with a pipeline hub.

Development within offshore oil and gas exploration in the recent years has been directed to subsea instalthelations for processing and transport of oil and gas. These subsea installations replace the traditional platforms, where oil and gas are transported up to the platform for further processing and transport. This development of subsea production, processing and transport systems has resulted in an increasing need for subsea connection arrangements for coupling together a longer pipeline installed on the seabed and a so-called spool piece without requiring any assistance of divers. A spool piece is used for connecting a pipeline termination to a pipe termination of a subsea installation, such as e.g. a subsea production manifold. The spool piece is designed to span between the end points of the pipeline termination and the pipe termination in order to complete a connection between the pipeline and the pipe. The spool piece is provided with a spool piece hub which shall mate with a corresponding pipeline hub arranged at the pipeline termination.

A pipeline termination skid to be mounted to a pipeline end section in order to support a pipeline hub of the pipeline end section during and after the connection of the pipeline hub to a corresponding spool piece hub is previously known from WO 2006/005994 A1. This known pipeline termination skid is so designed that a pipeline end section may be mounted thereto subsea by lowering the pipeline end section into a seat of one or more holding units of the pipeline termination skid and thereafter displacing the pipeline termination skid along the pipeline end section so that the respective seat is brought into engagement with an alignment element secured about the pipeline end section so as to thereby fix the pipeline end section axially and radially in relation to the pipeline termination skid. When the pipeline end section has been secured to the pipeline termination skid, a spool piece termination structure carrying the spool piece hub and a clamping device is connectable to the pipeline termination skid by being lowered into engagement therewith. After the landing of the spool piece termination structure on the pipeline termination skid, the actual connection of the pipeline hub to the spool piece hub may be performed by displacing the clamping device and the spool piece hub in relation to the pipeline termination skid and the pipeline hub so as to bring the pipeline hub and the spool piece hub into contact with each other, whereupon the clamping device is activated so as to clamp together the pipeline hub and the spool piece hub. The entire pipeline may be laid on the seabed before the measures of connecting the pipeline to the spool piece are initiated. With this solution, no landing platform or similar structure has to be secured to the pipeline end section when it is descended from the pipe-laying vessel, which will facilitate the pipe-laying operation and allow the pipeline to be laid out by means of a conventional pipe-laying vessel with capabilities related to the pipeline size rather than to a bulky pipeline termination. Thus, this solution will reduce the demands on the pipe-laying vessel with respect to its equipment as compared to other prior art solutions, for instance as disclosed in U.S. Pat. No. 4,019,334 A and U.S. Pat. No. 6,142,708 A, where a landing platform or the similar is secured to the pipeline end section before it leaves the pipe-laying vessel.

SUMMARY OF THE INVENTION

Embodiments of the present invention provide a new and advantageous pipeline termination skid, which in at least some aspect offers an advantage as compared to previously known pipeline termination skids.

According to an embodiment of the present invention, there is provided a pipeline termination skid. The pipeline termination skid comprises a mobile base frame for supporting the pipeline termination skid against the seabed or a seabed-based foundation, and one or more holding units for securing the pipeline end section and the associated pipeline hub to the pipeline termination skid in a predetermined orientation in relation to the pipeline termination skid, the respective holding unit being supported by the base frame, wherein the base frame at its bottom is provided with a downwardly directed opening for a pipeline end section so as to allow the pipeline termination skid to receive a pipeline end section, which rests on the seabed or on a seabed-based foundation, by lowering the pipeline termination skid downwards onto the pipeline end section; the respective holding unit is provided with a downwardly directed seat having a downwardly directed entrance opening located above the opening in the base frame so as to allow the pipeline end section received in the base frame to be moved into contact with the seat by being lifted upwards through the entrance opening in a direction essentially perpendicular to its own longitudinal axis; and the respective holding unit is provided with a locking device for securing the pipeline end section to the holding unit in a lifted position in contact with the seat of the holding unit.

With the pipeline termination skid according to an embodiment of the present invention, the pipeline termination skid may be landed directly onto the pipeline end section and adjusted into the correct axial position in relation to the pipeline end section before the pipeline end section is lifted into contact with the seat of the respective holding unit. Hereby, the pipeline termination skid may be lowered towards the seabed or a seabed-based foundation hanging in a crane hook of a hoisting device and given its final position on the seabed/foundation while remaining connected to the crane hook, whereupon the crane hook is disconnected from the pipeline termination skid and connected to the pipeline end section in order to lift the pipeline end section into contact with the seat of the respective holding unit. This will facilitate the connection of the pipeline termination skid to the pipeline end section as compared to the solution disclosed in WO 2006/005994 A1 where the pipeline end section has to be lifted and brought into engagement with the seat of the respective holding unit before the pipeline termination skid is moved along the pipeline end section into the correct axial position in relation to the pipeline end section.

Further advantages as well as advantageous features of the pipeline termination skid of the present invention will appear from the following description and the dependent claims.

Embodiments of the present invention also relate to a method for subsea connection of a pipeline termination skid of the present invention to a pipeline end section provided with a pipeline hub.

BRIEF DESCRIPTION OF THE DRAWINGS

With reference to the appended drawings, a specific description of embodiments of the present invention cited as examples follows below. In the drawings.

DETAILED DESCRIPTION OF THE EXEMPLARY EMBODIMENTS OF THE INVENTION

A pipeline termination skid 1 according to an embodiment of the present invention is shown in FIGS. 1-11. The termination skid 1 is intended for use in subsea connection of a pipeline to a spool piece. The termination skid 1 is to be mounted to a pipeline end section 2 so as to support a pipeline hub 3 during the connection of the pipeline hub to a corresponding spool piece hub.

The termination skid 1 comprises a base frame 10 for supporting the termination skid against the seabed or a seabed-based foundation. Thus, the termination skid 1 may be placed on the seabed or seabed-based foundation with the base frame 10 resting on the seabed or foundation. The base frame 10 is mobile in order to allow the entire termination skid 1 to be lifted and moved. Lifting lugs 11 are provided on the base frame 10. Lifting wires are attachable to the lifting lugs 11 so as to allow the base frame 10 and the rest of the termination skid 1 to be lifted through these lifting wires. The base frame 10 is designed as a framework construction, as illustrated in FIGS. 1-11. At its bottom, the base frame 10 is provided with a downwardly directed opening 12 for a pipeline end section 2 so as to allow the termination skid 1 to receive a pipeline end section, which rests on the seabed or on a seabed-based foundation, by lowering the termination skid downwards onto the pipeline end section in such a manner that the pipeline end section is received in the opening 12 in the base frame. In one embodiment, the base frame 10 comprises two elongated support members 13a, 13b arranged in parallel with each other on either side of the opening 12. The base frame 10 is configured to rest against the seabed or a seabed-based foundation through these support members 13a, 13b. In this case, the interspace between the support members 13a, 13b constitutes the opening 12 in the base frame.

In one embodiment, the termination skid 1 comprises two holding units 20a, 20b for securing the pipeline end section 2 and the associated pipeline hub 3 to the termination skid in a predetermined orientation in relation to the termination skid. The respective holding unit 20a, 20b is fixed to and supported by the base frame 10 and is located above the above-mentioned opening 12 in the base frame. In one embodiment, the respective holding unit 20a, 20b is mounted to the support members 13a, 13b and spans the interspace between them. The respective holding unit 20a, 20b is provided with a downwardly directed pipeline receiving seat 21 having a downwardly directed entrance opening 22 located above the opening 12 in the base frame 10. The pipeline end section 2 is insertable subsea through the entrance opening 22 of the respective seat 21 by being lifted upwards through the entrance opening 22 in a direction essentially perpendicular to its own longitudinal axis so as to be received in the seats 21. The respective holding unit 20a, 20b is provided with inclined guide members 23a, 23b (see FIG. 10) at opposite sides of the entrance opening 22, which guide members 23a, 23b are inclined towards each other as seen in the direction upwards so as to assist the lateral guiding and heading of a pipeline end section 2 through the entrance opening 22 and into the seat 21 of the holding unit. The base frame 10 is also provided with such guide members 14a, 14b (see FIG. 8) at opposite sides of the opening 12. The holding units 20a, 20b are arranged behind each other in such a way that their seats 21 are mutually aligned, i.e. in such a way that the centre axes of the seats are coinciding, so as to allow a pipeline end section 2 to extend rectilinearly through the seats 21 of both holding units. The respective holding unit 20a, 20b is provided with a locking device 30 for securing the pipeline end section 2 to the holding unit in a lifted position in contact with the seat 21 of the holding unit.

One holding unit 20a is provided with a guiding device 24 configured to come into engagement with an alignment element 4 on the pipeline end section 2 when the pipeline end section is lifted upwards through the entrance opening 22 of the seat 21 of the holding unit 20a so as to thereby guide the termination skid 1 into the correct axial position in relation to the pipeline end section 2. The holding unit 20a is also provided with one or more stop members 26, which are configured to engage with the alignment element 4 on the pipeline end section 2 in order to maintain the termination skid 1 in the correct axial position in relation to the pipeline end section. In one embodiment, the alignment element 4 is located behind the pipeline hub 3 at the front end of the pipeline end section 2 and has the form of a flange extending around the pipeline end section. The alignment element 4 is fixedly secured in relation to the pipeline hub 3 and is, in an embodiment, rotationally symmetric.

The locking device 30 of the respective holding unit 20a, 20b comprises two locking members 31 arranged at opposite sides of the entrance opening 22 of the seat 21 of the holding unit. Each locking member 31 is moveably mounted to the holding unit 20a, 20b so as to be moveable by operating means 32 from an unlocking position (see FIGS. 7 and 10), in which the locking member 31 allows a pipeline end section 2 to pass into or out of the seat 21 through the entrance opening 22, to a locking position (see FIGS. 8 and 11), in which the locking member 31 prevents a pipeline end section 2 received in the seat 21 from passing out of the seat through the entrance opening 22 and thereby keeps the pipeline end section 2 secured to the holding unit 20a, 20b in a lifted position in contact with the seat 21 of the holding unit.

In one embodiment, each locking member 31 is pivotally mounted to the associated holding unit 20a, 20b and provided with a guide groove 33, which is located above the pivot axis A of the locking member. The operating means 32 comprise an operating member 34 slidably received in the guide groove 33 of the locking member and a vertically extending operating rod 35 rotatably mounted to the associated holding unit 20a, 20b. The operating rod 35 extends through a through hole 36 (see FIG. 9) in the operating member 34 and is axially fixed to the holding unit 20a, 20b. The operating rod 35 and the operating member 34 are operably connected to each other by the engagement between an external thread on the operating rod 35 and a corresponding internal thread in the hole 36 of the operating member 34, so as to make the operating member 34 move downwards along the operating rod 35 when the operating rod is rotated in a first direction and upwards along the operating rod 35 when the operating rod is rotated in an opposite second direction. The operating member 34 and the guide groove 33 of the locking member 31 are configured to co-operate so as to make the locking member 31 pivot from the unlocking position to the locking position when the operating member 34 is moved in a given direction along the operating rod 35. In one embodiment, the locking member 31 is pivoted from the unlocking position to the locking position when the operating member 34 is moved downwards along the operating rod 35 and from the locking position to the unlocking position when the operating member 34 is moved upwards along the operating rod 35. The operating member 34 is slidably connected to a vertical first guide track 39a and a vertical second guide track 39b, which are mutually parallel and arranged in the associated holding unit 20a, 20b on either side of the operating rod 35. The operating member 34 is slidably connected to the first and second guide tracks 39a, 39b and is vertically moveable upwards and downwards along these guide tracks. The respective guide track 39a, 39b has the form of a groove arranged in a vertical plate of the holding unit 20a, 20b.

In one embodiment, the operating member 34 has the form of an elongated and horizontally extending pin which extends through the guide groove 33 of the locking member 31, a first end of the operating member 34 being engaged with the first guide track 39a and an opposite second end of the operating member being engaged with the second guide track 39b.

The above-mentioned through hole 36 of the operating member 34, in an embodiment, extends across the operating member at the middle thereof The operating rod 35 is rotated by means of a torque tool (not shown) that may be detachably mounted to a socket 37 arranged at the upper end of the operating rod.

Figure 1:
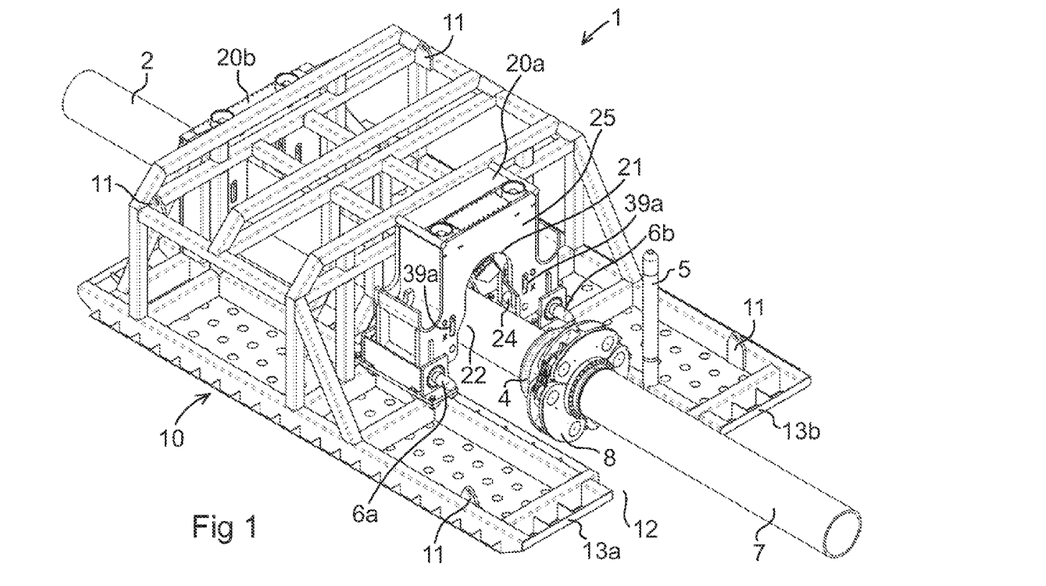
FIG. 1 is a perspective view from the front of a pipeline termination skid according to an embodiment of the present invention and a pipeline end section to be connected to the pipeline termination skid.
Figure 2:
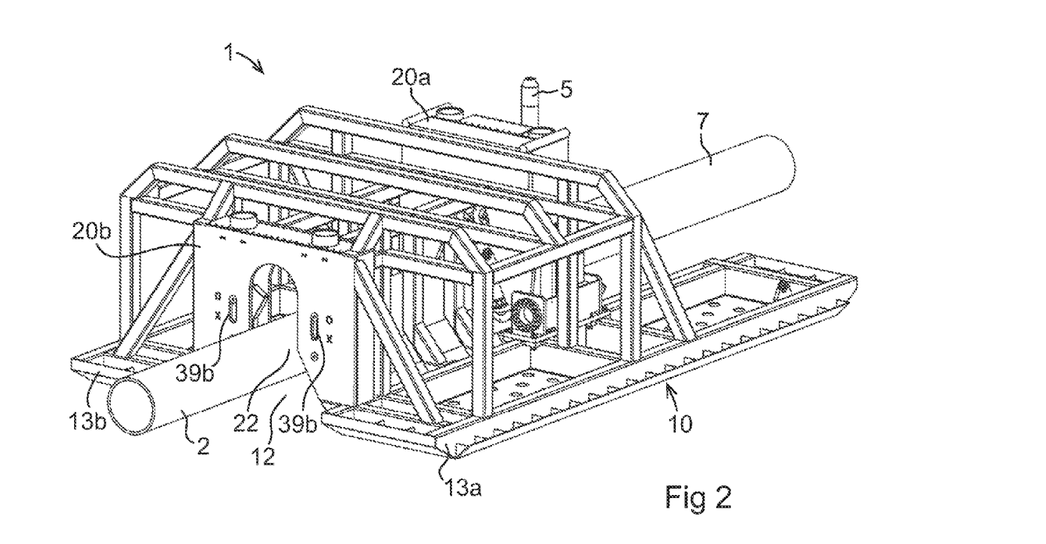
FIG. 2 is a perspective view from behind of the pipeline termination skid and pipeline end section according to FIG. 1.
Figure 3:
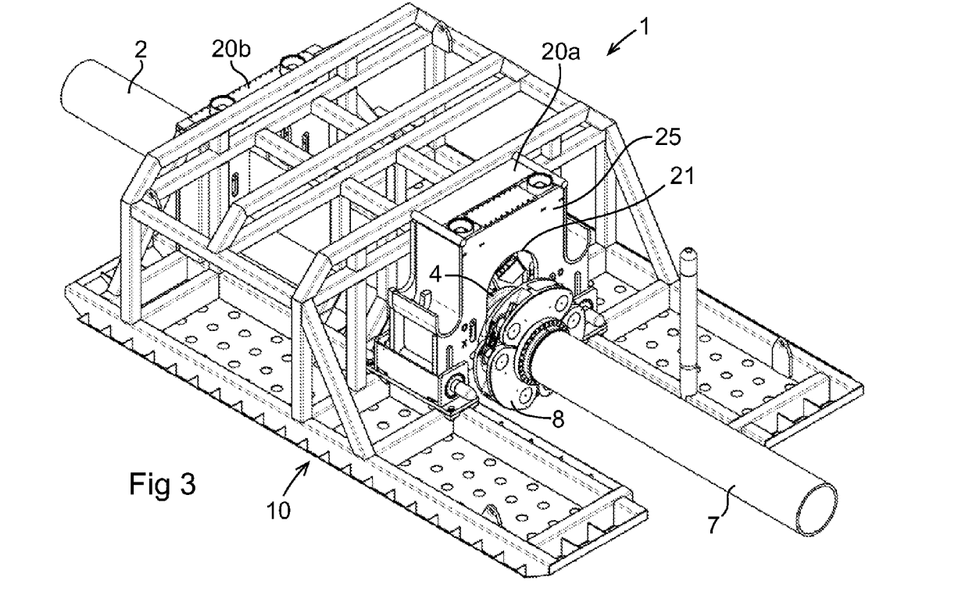
FIGS. 3, 4, and 5 are perspective views of the pipeline termination skid and pipeline end section according to FIG. 1, as seen at different stages during the process of connecting the pipeline end section to the pipeline termination skid.
Figure 4:
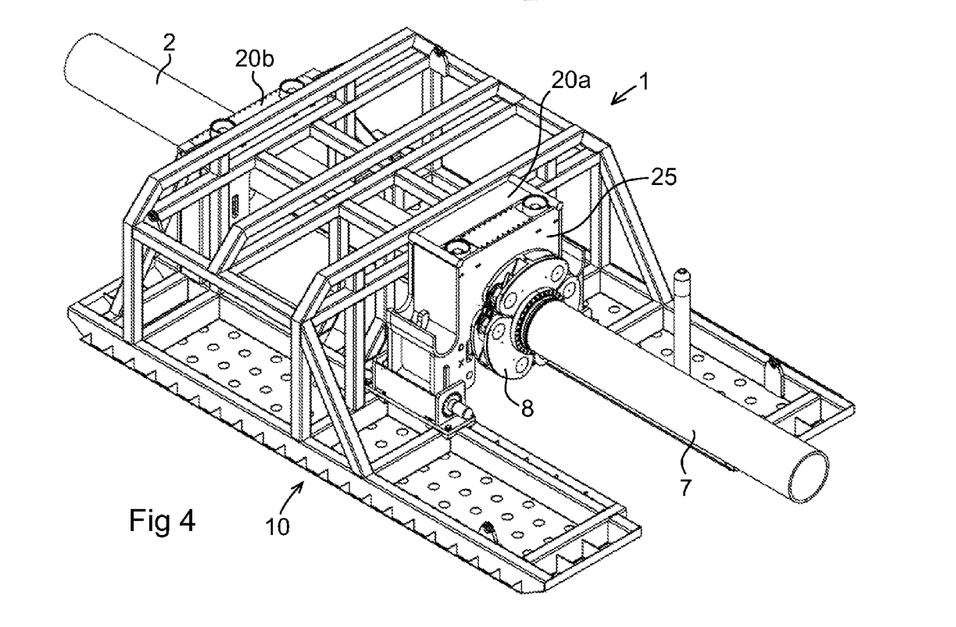
Figure 5:
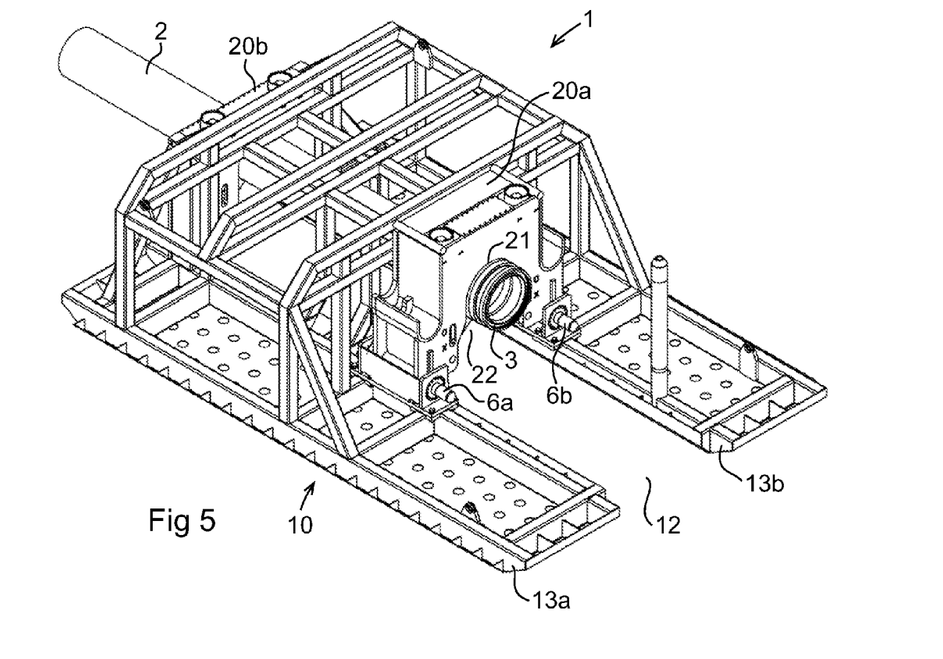
Figure 6:
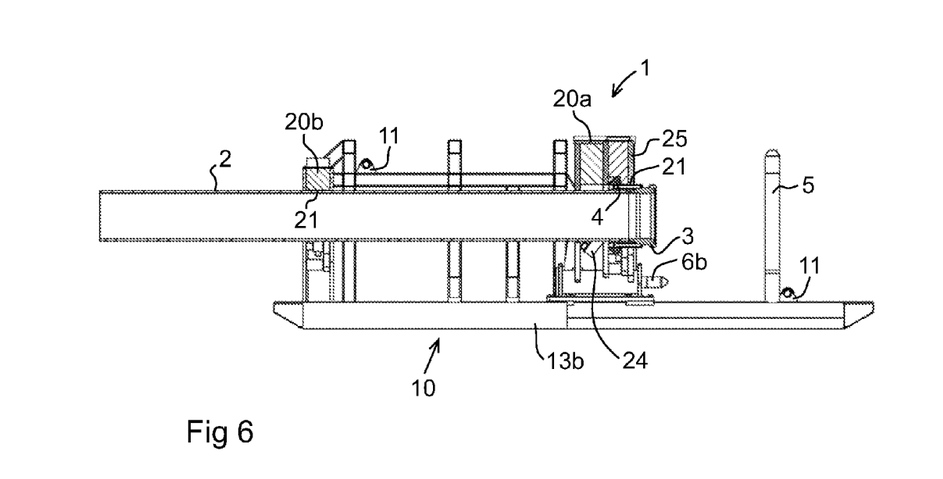
FIG. 6 is a longitudinal section through the pipeline termination skid according to FIG. 1 with a pipeline end section connected to it.
Figure 7:
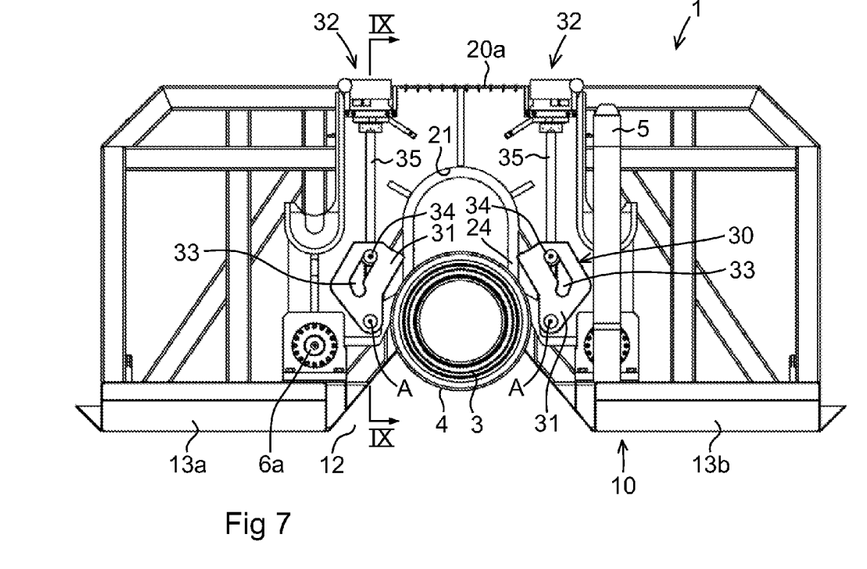
FIGS. 7 and 8 are partly cut front views of the pipeline termination skid and pipeline end section according to FIG. 1, as seen at two different stages during the process of connecting the pipeline end section to the pipeline termination skid.
Figure 8:
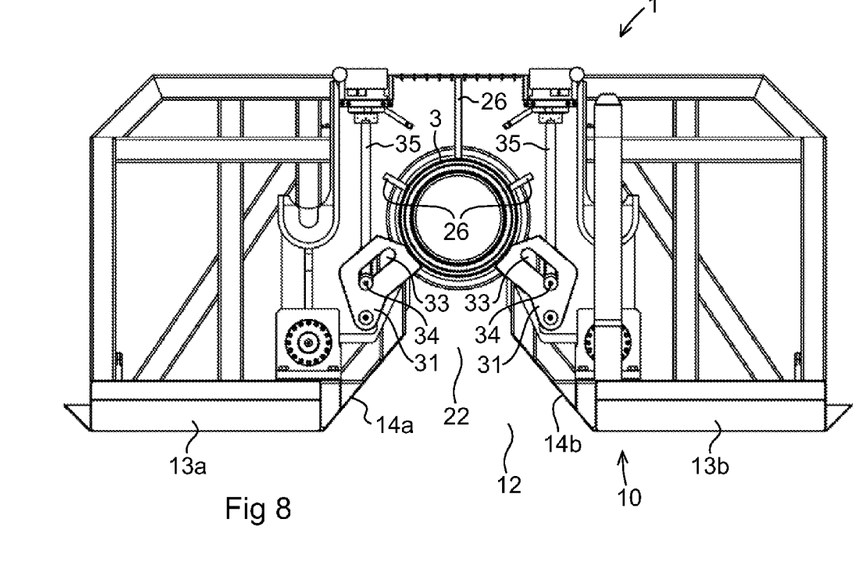
Figure 9:
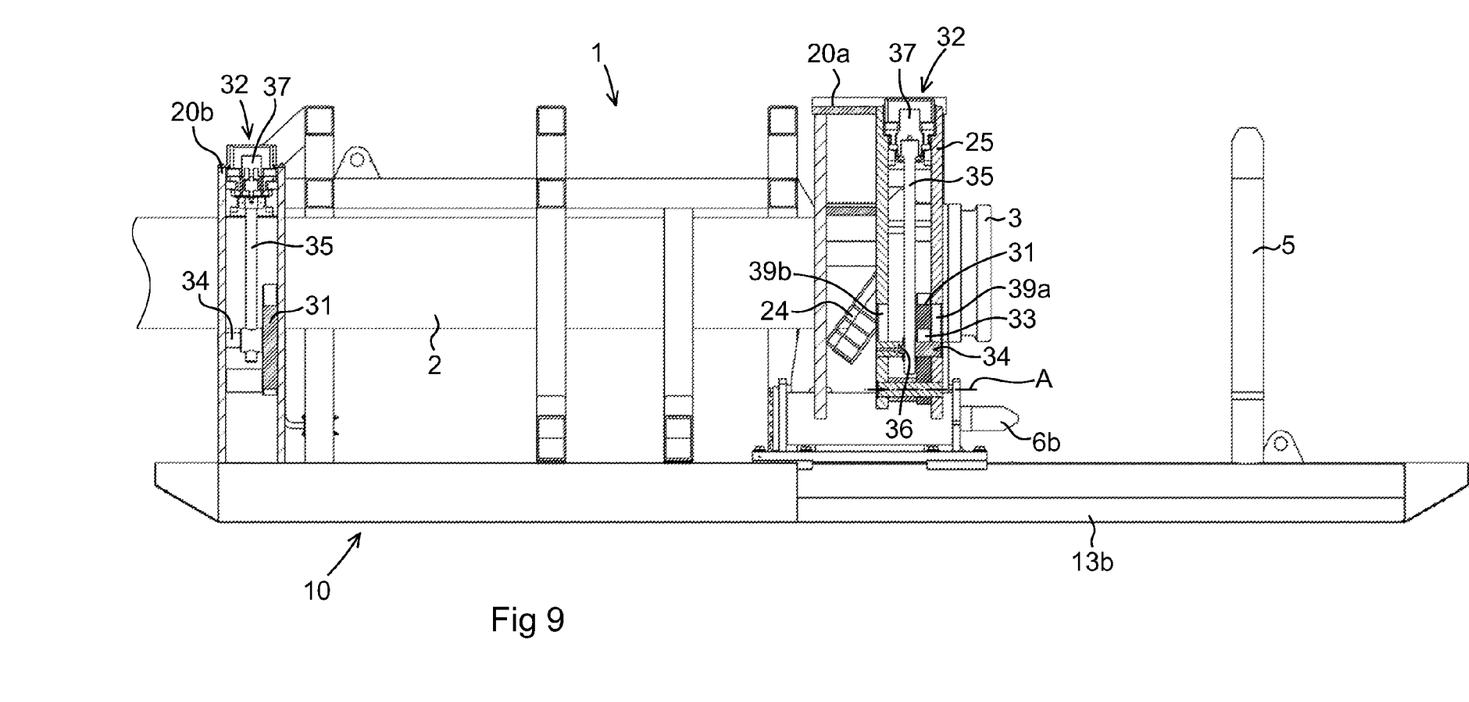
FIG. 9 is a cut according to the line IX-IX in FIG. 7.
Figure 10:
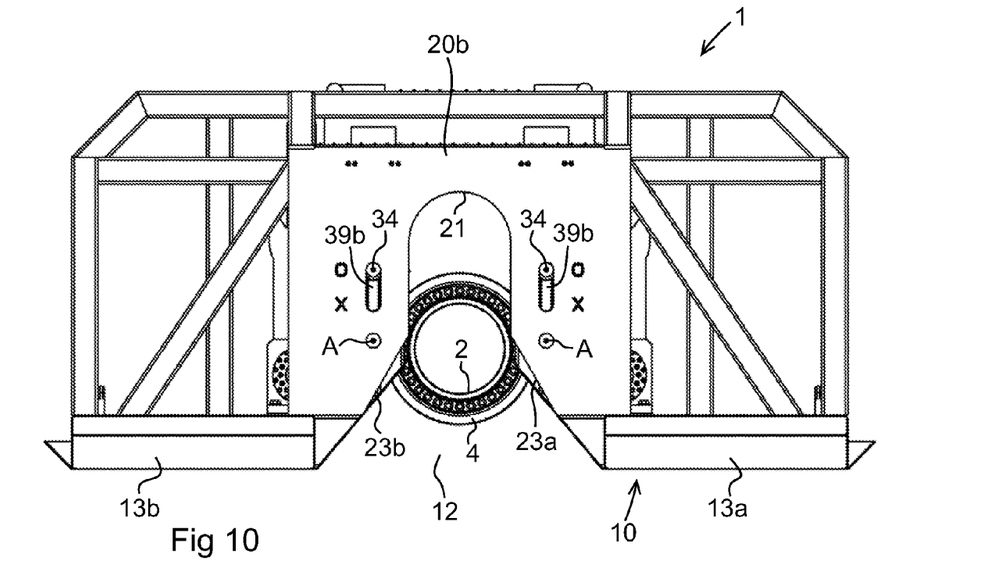
FIG. 10 is a rear view of the pipeline termination skid and pipeline end section according to FIG. 1.
Figure 11:
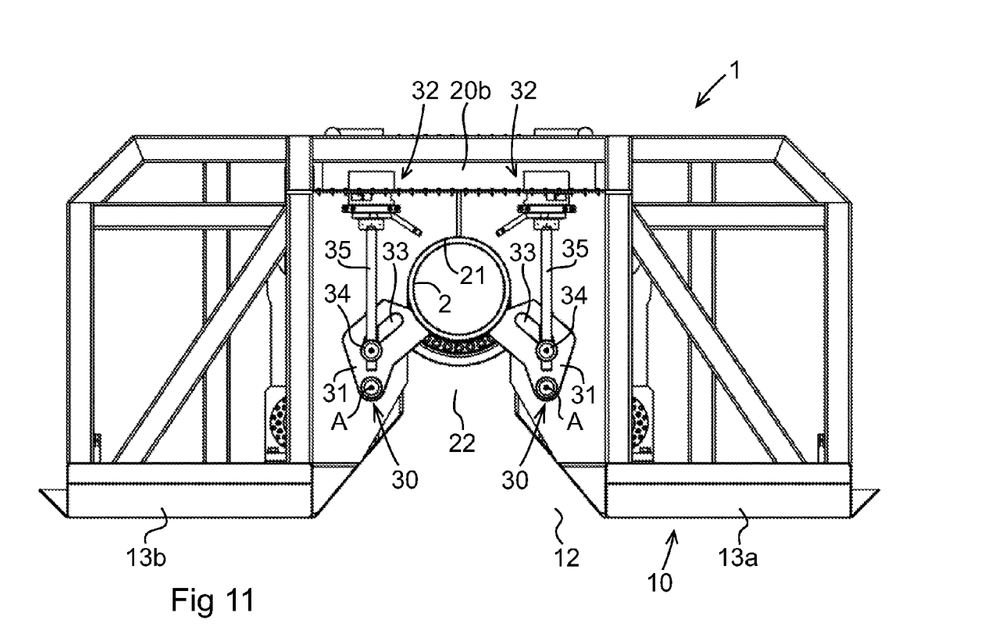
FIG. 11 is a partly cut rear view of the pipeline termination skid and pipeline end section according to FIG. 1.

Different stages in a process of connecting the pipeline termination skid 1 to a pipeline end section 2 provided with a pipeline hub 3 are illustrated in FIGS. 1-5. An installation head 7 is detachably connected to the pipeline end section 2 by means of a clamp connector 8, which is clamped to the pipeline hub 3 and to a corresponding hub of the installation head 7. The pipeline end section 2 is then laid on the seabed or a seabed-based foundation with the clamp connector 8 resting against the seabed or foundation. The termination skid 1 is lowered into the sea, e.g. from a surface vessel, while hanging in a crane hook of a hoisting device through lifting wires attached to the lifting lugs 11 of the base frame 10. The termination skid 1 is lowered downwards onto the pipeline end section 2 so as to bring the base frame 10 of the termination skid to bear against the seabed or foundation with the pipeline end section 2 received in the downwardly directed opening 12 of the base frame, as illustrated in FIGS. 1 and 2. The seats 21 of the holding units 20a, 20b are now located vertically above the pipeline end section 2 with the centre line of the seats 21 extending essentially in parallel with the pipeline end section. In this position, the alignment element 4 and the clamp connector 8 should be located in front of the fore holding unit 20a, as seen in the longitudinal direction of the pipeline end section 2. The termination skid 1 is then, by means of the above-mentioned hoisting device, moved forwards in relation to the pipeline end section 2 in the longitudinal direction thereof so as to bring the fore holding unit 20a into contact with the clamp connector 8, as illustrated in FIG. 3. In this position, the clamp connector 8 abuts against a front plate 25 of the fore holding unit 20a. The crane hook of the hoisting device is then disconnected from the above-mentioned lifting wires and connected to lifting slings (not shown) pre-attached to the pipeline end section 2 and the installation head 7, whereupon the pipeline end section 2 is lifted upwards by means of the hoisting device in a direction essentially perpendicular to its own longitudinal axis through the entrance opening 22 of the seats 21 of the holding units 20a, 20b so as to move the pipeline end section 2 into contact with the seats, as illustrated in FIG. 4. During this lifting of the pipeline end section 2, the alignment element 4 on the pipeline end section 2 comes into contact with the guiding device 24 of the fore holding unit 20a and the termination skid 1 is guided into the correct axial position in relation to the pipeline end section 2 by the mutual co-operation between the guiding device 24 and the alignment element 4. When the pipeline end section 2 has been brought into contact with the seats 21 of the holding units 20a, 20b, the locking devices 30 of the holding units 20a, 20b are operated by means of a torque tool to secure the pipeline end section 2 to the holding units 20a, 20b in a lifted position in contact with the seats 21 of the holding units. Finally, the clamp connector 8 and the installation head 7 are disconnected from the pipeline hub 3, as illustrated in FIG. 5.

The pipeline termination skid 1 is intended to co-operate with a spool piece termination structure (not shown) that is to be mounted to a spool piece so as to support a spool piece hub during the connection of the spool piece hub to the pipeline hub 3 of a pipeline end section 2 mounted to the pipeline termination skid 1. Such a spool piece termination structure may for instance be of the type disclosed in WO 2006/005994 A1. The spool piece termination structure is to be landed onto the support members 13a, 13b of the base frame 10 in front of the fore holding unit 20a. The pipeline termination skid 1 is provided with a guide post 5, which is mounted to the base frame 10. The spool piece termination structure is provided with a guide funnel, which is designed to engage with the guide post 5 when the spool piece termination structure is lowered into contact with the base frame 10 of the pipeline termination skid 1 so as to properly guide the spool piece termination structure into engagement with the pipeline termination skid 1. Furthermore, the pipeline termination skid 1 is provided with alignment members 6a, 6b which are designed to come into contact with corresponding alignment members on the spool piece termination structure when a base frame of the spool piece termination structure landed onto the pipeline termination skid 1 is displaced towards the pipeline hub 3 of a pipeline end section 2 secured to the pipeline termination skid 1 so as to properly align the pipeline hub 3 in relation to the spool piece hub. In one embodiment, the alignment members 6a, 6b of the pipeline termination skid 1 consist of two male-like alignment members in the form of spears, which are designed to fit into corresponding female-like alignment members, which in an embodiment, in the form of spear funnels, arranged on the spool piece termination structure. In an embodiment, the pipeline termination skid 1 could be provided with alignment members in the form of spear funnels designed for engagement with alignment members in the form of spears arranged on the spool piece termination structure.

The invention is of course not in any way restricted to the embodiments described above. On the contrary, many possibilities to modifications thereof will be apparent to a person with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural element with insubstantial differences from the literal languages of the claims.

What is claimed is:

1. A pipeline termination skid to be mounted to a pipeline end section to support a pipeline hub of the pipeline end section during and after the connection of the pipeline hub to a corresponding spool piece hub, the pipeline termination skid comprising:
a mobile base frame configured to support the pipeline termination skid against a seabed or a seabed-based foundation; and
one or more holding units configured to secure the pipeline end section and the pipeline hub to the pipeline termination skid in a predetermined orientation in relation to the pipeline termination skid, the one or more holding unit supported by the base frame;
the base frame comprises, at the bottom of the base frame, a downwardly directed opening for the pipeline end section to allow the pipeline termination skid to receive the pipeline end section, on the seabed or on the seabed-based foundation, by lowering the pipeline termination skid downwards onto the pipeline end section;
the one or more holding unit comprises a downwardly directed seat comprising a downwardly directed entrance opening located above the opening of the base frame to allow the pipeline end section received in the base frame to be moved into contact with the seat by lifted upwards through the entrance opening in a direction essentially perpendicular to the longitudinal axis of the pipeline end section; and
the one or more holding unit further comprises a locking device configured to secure the pipeline end section to the one or more holding unit in a lifted position in contact with the seat of the one or more holding unit.

2. The pipeline termination skid according to claim 1, wherein the one or more holding unit comprises at least two holding units with mutually aligned seats.

3. The pipeline termination skid according to claim 2, wherein one of the at least two holding units is provided with a guiding device configured to engage with an alignment element on the pipeline end section when the pipeline end section received in the base frame is lifted upwards through the entrance opening of the seat to guide the pipeline termination skid into a correct axial position in relation to the pipeline end section.

4. The pipeline termination skid according to claim 1, wherein the base frame comprises two elongated support members arranged in parallel with each other on either side of the opening of the base frame, the base frame configured to rest against the seabed or the seabed-based foundation through the two support members.

5. The pipeline termination skid according to claim 1, wherein the base frame and/or the one or more holding unit is provided with inclined guide members inclined towards each other as seen in the direction upwards to assist the lateral guiding and heading of the pipeline end section through the entrance opening and into the seat of the one or more holding unit.

6. The pipeline termination skid according to claim 1, wherein the locking device comprises:
at least one locking member moveably mounted to the one or more holding unit to be moveable to a locking position, wherein the at least one locking member keeps the pipeline end section secured to the one or more holding unit in a lifted position in contact with the seat of the one or more holding unit; and
an operating means for moving the at least one locking member to the locking position.

7. The pipeline termination skid according to claim 6, wherein the at least one locking member is pivotally mounted to the one or more holding unit.

8. The pipeline termination skid according to claim 7, wherein:
the at least one locking member comprises a guide groove,
the operating means comprises an operating member slidably received in the guide groove of the at least one locking member, and a vertically extending operating rod rotatably mounted to the one or more holding unit, the operating rod extending through a hole in the operating member and axially fixed to the one or more holding unit,
the operating rod and the operating member are operably connected to each other, by the engagement between an external thread on the operating rod and a corresponding internal thread in the hole in the operating member, to make the operating member move downwards along the operating rod when the operating rod is rotated in a first direction, and move upwards along the operating rod when the operating rod is rotated in a second direction opposite to the first direction; and
the guide groove and the operating member are configured to co-operate to make the at least one locking member pivot from an unlocking position to the locking position when the operating member is moved in a given direction along the operating rod.

9. The pipeline termination skid according to claim 8, wherein the operating member is slidably connected to a vertical first guide track and a vertical second guide track, the first guide track and the second guide track are mutually parallel and arranged in the one or more holding unit on either side of the operating rod, the operating member slidably connected to the first guide track and the second guide track and vertically moveable upwards and downwards along the first guide track and the second guide track.

10. The pipeline termination skid according to claim 9, wherein the operating member has the form of an elongated and horizontally extending pin which extends through the guide groove of the at least one locking member, a first end of the operating member engaged with the first guide track and a second end, opposite to the first end, of the operating member engaged with the second guide track.

11. The pipeline termination skid according claim 6, wherein the at least one locking member comprises two locking members arranged at opposite sides of the entrance opening of the seat.

12. A method for subsea connection of a pipeline termination skid to a pipeline end section comprising a pipeline hub to support the pipeline hub during and after the connection of the pipeline hub to a corresponding spool piece hub, the pipeline termination skid comprising a mobile base frame configured to support the pipeline termination skid against a seabed or a seabed-based foundation, and one or more holding unit configured to secure the pipeline end section and the pipeline hub to the pipeline termination skid in a predetermined orientation in relation to the pipeline termination skid, the one or more holding unit supported by the base frame, wherein the base frame comprises, at the bottom of the base frame, a downwardly directed opening for the pipeline end section, and the one or more holding unit comprises a downwardly directed seat comprising a downwardly directed entrance opening located above the opening of the base frame, and a locking device, the method comprising:

clamping a clamp connector to the pipeline hub;

laying the pipeline end section on the seabed or the seabed-based foundation with the clamp connector resting against the seabed or the seabed-based foundation;

lowering the pipeline termination skid downwards onto the pipeline end section to bring the base frame of the pipeline termination skid to bear against the seabed or the seabed-based foundation with the pipeline end section received in the downwardly directed opening of the base frame;

moving the pipeline termination skid in the longitudinal direction of the pipeline end section to bring the one or more holding unit of the pipeline termination skid into contact with the clamp connector;

lifting the pipeline end section upwards through the entrance opening of the seat of the one or more holding unit to move the pipeline end section into contact with the seat; and securing the pipeline end section, by operating the locking device of the one or more holding unit, to the one or more holding unit in a lifted position in contact with the seat of the one or more holding unit.

13. The method according to claim 12, further comprising:
providing the one or more holding units with at least two holding units with mutually aligned seats.

14. The method according to claim 12, further comprising:
arranging two elongated support members in parallel with each other on either side of the opening of the base frame, the base frame configured to rest against the seabed or the seabed-based foundation through the two support members.

15. The method according to claim 13, further comprising:
providing one of the at least two holding units with a guiding device configured to engage with an alignment element on the pipeline end section when the pipeline end section received in the base frame is lifted upwards through the entrance opening of the seat to guide the pipeline termination skid into a correct axial position in relation to the pipeline end section.

16. The method according to claim 12, further comprising:
providing the base frame and/or the one or more holding units with inclined guide members inclined towards each other as seen in the direction upwards to assist the lateral guiding and heading of the pipeline end section through the entrance opening and into the seat of the one or more holding unit.

17. The method according to claim 12, further comprising:
moveably mounting at least one locking member to the one or more holding unit to be moveable to a locking position, wherein the at least one locking member keeps the pipeline end section secured to the one or more holding unit in a lifted position in contact with the seat of the one or more holding units; and moving the at least one locking member to the locking position by an operating means.

18. The method according to claim 17, further comprising:
pivotally mounting the at least one locking member to the one or more holding units.

19. The method according to claim 18, further comprising:
slidably receiving an operating member of the operating means in a guide groove of the at least one locking member;

rotatably mounting a vertically extending operating rod to the one or more holding units, the operating rod extending through a hole in the operating member and axially fixed to the one or more holding units;

operably connecting the operating rod and the operating member to each other by the engagement between an external thread on the operating rod and a corresponding internal thread in the hole in the operating member to make the operating member move downwards along the operating rod when the operating rod is rotated in a first direction and move upwards along the operating rod when the operating rod is rotated in a second direction opposite to the first direction; and configuring the guide groove and the operating member to cooperate to make the at least one locking member pivot from an unlocking position to the locking position when the operating member is moved in a given direction along the operating rod.

20. The method according to claim 19, further comprising:
slidably connecting the operating member to a vertical first guide track and a vertical second guide track, wherein the first guide track and the second guide track are mutually parallel and arranged in the one or more holding units on either side of the operating rod, and slidably connecting the operating member to the first guide track and the second guide track and vertically moveable upwards and downwards along the first guide track and the second guide track.

* * * * *